US010607292B2

(12) United States Patent
Levine et al.

(10) Patent No.: US 10,607,292 B2
(45) Date of Patent: Mar. 31, 2020

(54) SYSTEM FOR REMUNERATION FOR LOST BAGGAGE

(71) Applicant: Blue Ribbon Bags, LLC, New York, NY (US)

(72) Inventors: Daniel Levine, Englewood, NJ (US); Gabriel Menkin, New York, NY (US); Don Yahalom, Englewood, NJ (US)

(73) Assignee: Blue Ribbon Bags, LLC, New York, NY (US)

( * ) Notice: Subject to any disclaimer, the term of this patent is extended or adjusted under 35 U.S.C. 154(b) by 73 days.

(21) Appl. No.: 14/144,071

(22) Filed: Dec. 30, 2013

(65) Prior Publication Data
US 2014/0188523 A1 Jul. 3, 2014

Related U.S. Application Data

(60) Provisional application No. 61/746,782, filed on Dec. 28, 2012, provisional application No. 61/876,660, filed on Sep. 11, 2013.

(51) Int. Cl.
*G06Q 40/08* (2012.01)
(52) U.S. Cl.
CPC .................... *G06Q 40/08* (2013.01)
(58) Field of Classification Search
CPC ....................................................... G06Q 40/08
(Continued)

(56) References Cited

U.S. PATENT DOCUMENTS 5,299,116 A * 3/1994 Owens ................ G06Q 10/087
235/385
6,662,078 B1 * 12/2003 Hardgrave ............ G06Q 10/02
700/226
(Continued)

FOREIGN PATENT DOCUMENTS

CA 2595374 * 1/2009
CA 2595374 A1 1/2009
(Continued)

OTHER PUBLICATIONS

International Search Report from the International Searching Authority from corresponding PCT/US2013/078332 dated May 5, 2014 (3 Pages).
(Continued)

*Primary Examiner* — Hani M Kazimi
*Assistant Examiner* — Hatem M Ali
(74) *Attorney, Agent, or Firm* — Ohlandt, Greeley, Ruggiero & Perle, L.L.P.

(57) ABSTRACT

The present disclosure provides a process for a passenger to receive remuneration for baggage or luggage that is lost by an airline notwithstanding the contents of the baggage. The process charges a predetermined amount of coverage on a leg of an airline flight for the baggage notwithstanding the contents of the baggage, obtains information via any type of electronic medium from the airline and creates a physical receipt so that the amount of coverage can be obtained by the person covered after a certain period of time easily and without any further proof. The method includes waiting for a first fixed period of time for the airline to declare that the baggage is lost, and waiting for a second, fixed period of time that is longer in duration than the first, fixed period of time, to file a claim for the declared lost baggage.

8 Claims, 7 Drawing Sheets

(58) Field of Classification Search
USPC .................................................... 705/4, 35
See application file for complete search history.

(56) References Cited

U.S. PATENT DOCUMENTS

| | | | |
|---|---|---|---|
| 8,510,160 B1* | 8/2013 | Bufford ............. | G06Q 30/0215 705/14.33 |
| 2002/0134836 A1* | 9/2002 | Cash ..................... | G06Q 10/08 235/385 |
| 2007/0214021 A1* | 9/2007 | McLaughlin ......... | G06Q 30/02 705/4 |
| 2008/0082418 A1* | 4/2008 | Fordyce ................ | G06Q 30/02 705/14.34 |
| 2012/0052879 A1* | 3/2012 | Wildon .................. | A45C 13/18 455/456.1 |
| 2012/0066008 A1* | 3/2012 | Scudder ................ | G06Q 10/10 705/4 |
| 2012/0116821 A1* | 5/2012 | Vasavada .............. | G06Q 40/08 705/4 |
| 2013/0211864 A1* | 8/2013 | Sanderson ............ | G06Q 10/02 705/5 |
| 2013/0234849 A1* | 9/2013 | Gupta ................... | A45C 13/18 340/539.11 |

FOREIGN PATENT DOCUMENTS

| | | |
|---|---|---|
| CA | 2 806 612 A1 | 2/2012 |
| CN | 1317431 A | 10/2001 |
| CN | 1591500 A | 3/2005 |
| CN | 1630888 A | 6/2005 |
| CN | 101004821 A | 7/2007 |
| CN | 101014152 A | 8/2007 |
| JP | 2003030441 A | 1/2003 |
| JP | 2004021435 A | 1/2004 |
| JP | 2005301501 A | 10/2005 |

OTHER PUBLICATIONS

Written Opinion from the International Searching Authority from corresponding PCT/US2013/078332 dated May 5, 2014 (9 Pages).
International Preliminary Report on Patentability dated Jul. 9, 2015 from corresponding International Patent Application No. PCT/US2013/078332, 7 pages.
Japanese First Office Action dated Apr. 20, 2017 from corresponding Japanese Patent Application No. 2015-550847, 9 pages.
Hae-Kyun Jo et al "Moral Risk Management (2)" General Insurance Research, The General Insurance Institute of Japan, Jun. 10, 1991, vol. 53, Issue 1 p. 67 (see Statement of Relevance).
Japanese Office Action for the corresponding application JP2015550847, 9 pages, dated Oct. 17, 2017.
Australian First Examination Report dated Sep. 21, 2018 from corresponding Australian Patent Application No. 2013369967, 3 pages.
Chinese First Office Action dated May 28, 2018 from corresponding Chinese Patent Application No. 201380073847.6, 20 pages.
Korean Notification of Refusal dated May 8, 2019 from corresponding Korean Patent Application No. 10-2015-7017248, 9 pages.
Israel Second Office Action dated May 16, 2019 from corresponding Israeli Patent Application No. 239489, 6 pages.
Chinese Second Office Action dated Jan. 30, 2019 from corresponding Chinese Patent Application No. 201380073847.6, 18 pages.

* cited by examiner

SYSTEM FOR REMUNERATION FOR LOST BAGGAGE

CROSS REFERENCE TO RELATED APPLICATIONS

This application claims the benefit of U.S. Provisional Application Ser. No. 61/746,782, filed Dec. 28, 2012, and U.S. Provisional Application Ser. No. 61/876,660, filed Sep. 11, 2013, the contents of which are incorporated by reference herein.

BACKGROUND OF THE DISCLOSURE

Field of the Disclosure

The present disclosure relates to a process for remunerating for loss of baggage. More particularly, the present disclosure relates to processes for remuneration that pays a passenger if his/her baggage is lost by the airline without the need to prove the value of the contents of the baggage. Even more particularly, the present disclosure relates to processes in which a bag is assured a set fee for a specific amount of remuneration without any proof of the value of the contents of the lost baggage.

Field of the Related Art

The travel industry is a growth industry with a growing number of domestic airline passengers. According to a monthly study done by the Office of Aviation Enforcement and Proceedings of the U.S. Department of Transportation, there was an average of 6.04 reports of mishandled baggage for every 1000 passengers in 2005.

The travel insurance industry in the United States offers many different types of insurance policies available for purchase by a passenger. Current travel insurance policies range from very broad to very specific coverage. Some policies provide a passenger with insurance for any event that could arise while traveling. Other policies provide a passenger with insurance coverage for very explicit, narrowly defined circumstances.

The contemporary airline market is that the passenger must obtain both travel insurance and baggage insurance. Most travel insurances bundle a variety of different coverage amounts into one policy. These policies can cost as little as $20. However, in most situations, the premium will be over $60. These policies cover very broad risks including: trip cancellation, medical coverage, life insurance, and car rental insurance. Also, the details of these policies can overwhelm a passenger.

Other types of baggage insurance include package policies that are designed for travelers going on a single trip. They can be used for cruises, tours, flights, house rentals and other trip types. These policies include coverage for trip cancellation, baggage, medical, dental, emergency evacuation, 24 hour traveler assistance, baggage delay, travel delay, and accidental death coverage. Some policies also have options for collision/damage coverage for rented cars, flight insurance (a form of accidental death coverage while flying only) and added emergency evacuation insurance. Some package policies include coverage for children at no extra charge. The prices for this policy range from $19 to $56 without many of the above coverage amounts, and increase in cost from there.

There are also business package policies that are uniquely designed for individual business travelers and small to mid-size companies with traveling employees. These polices also provide for baggage and business effects including the costs of trade shows and business conferences as well as the expense of lost, stolen and/or damaged laptops, cell phones and booth exhibits. These policies cost an average of $69 per trip assuming your business has an account for which they pay an annual fee.

Some homeowners' insurance policies offer their policyholders this option. A policyholder would have to prove the value of their luggage, and would have to pay a much higher premium for that type of policy.

Further, some credit card companies offer additional coverage for their traveling passengers for their baggage. All of the above prior solutions require the passenger to prove the value of the contents of their baggage.

BRIEF SUMMARY OF THE PRESENT DISCLOSURE

The present disclosure provides a process for a passenger to receive remuneration for a baggage or luggage that is lost by an airline notwithstanding the contents of the baggage.

The present disclosure also provides such a process to receive remuneration on a baggage loss, which process is simple and easy in order to reduce the airline passenger's trauma of losing the baggage.

The present disclosure further provides such a process in which coverage, including, but not limited to, forms of traditional insurance policies and service agreements or contracts, is secured at the time of ticket purchase or at a later date before the flight.

The present disclosure still further provides such a process that charges a predetermined amount of coverage on a leg of an airline flight for a passenger's baggage that is monitored by the airline.

The present disclosure also provides a process that charges a predetermined amount of coverage on a leg of an airline flight for a passenger's baggage that is monitored by the airline, notwithstanding the contents of the baggage, obtains information via any type of electronic medium from the airline, as well as other sources, and creates a physical receipt so that the amount of coverage can be obtained by the person covered after a certain period of time easily and without any further proof.

The present disclosure further provides a method of monitoring baggage and providing remuneration should the baggage be lost. The method includes checking one or more pieces of baggage at an airline for an airline flight, purchasing coverage for baggage at a fixed price notwithstanding the contents of either baggage at any time before departure of the flight, waiting for a first fixed period of time for the airline to declare that either one or that one or more pieces of baggage is lost, and waiting for a second, fixed period of time that is longer in duration than the first, fixed period of time, to file a claim for the declared lost baggage.

The present disclosure still further provides that such method includes determining the number of legs of a trip, determining the length of time of each leg of the trip that are beyond a third, fixed period of time, and based on the determinations advising whether more than one policies, agreements, or contracts are needed.

DETAILED DESCRIPTION OF THE EXEMPLARY EMBODIMENTS

Figure 1:
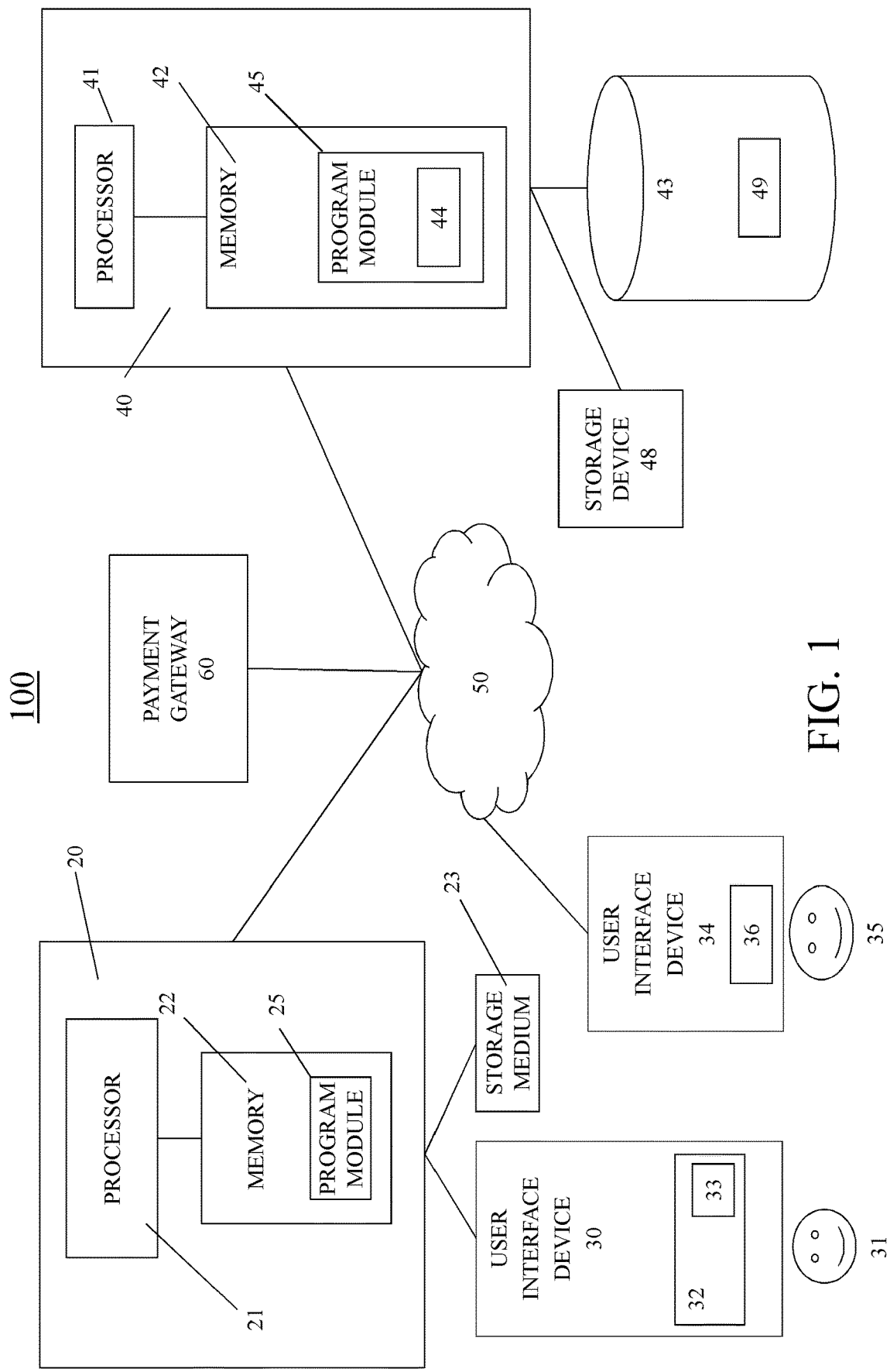
FIG. 1 is a schematic of the system of the present disclosure.

Referring to the drawings and, in particular, FIG. 1, there is shown a system according to the present disclosure generally represented by reference numeral 100. System 100 includes a computer 20 of an airline, one or more user interface devices 30 and 34, of which user interface device 30 is operatively connected to computer 20, a host or technology owner computer 40, and a network 50, such as, for example, the Internet, operatively connecting each computer 20. It is to be noted that common numbers carry over among the figures.

Computer 20 is a central computer for an airline. Computer 20 includes a processor 21, and a memory 22. Memory 22 has a program module 25. Computer 20 is located remote from user interfaces 30 and 34. Although computer 20 is represented herein as a stand-alone device, it is not limited to such a device. Computer 20 can be coupled to other devices (not shown) in a distributed processing system.

Processor 21 is an electronic device configured of logic circuitry that responds to and executes instructions.

Memory 22 is a tangible computer-readable storage medium encoded with a computer program. In this regard, memory 22 stores data and instructions, readable and executable by processor 21, for controlling the operation of processor 21. Memory 22 can be implemented in a random access memory (RAM), a hard drive, a read only memory (ROM), or a combination thereof.

Program module 25 contains instructions for controlling processor 21 to execute the methods described herein. The term "module" used herein denotes a functional operation that can be embodied either as a stand-alone component or as an integrated configuration of a plurality of subordinate components. Thus, program module 25 can be implemented as a single module or as a plurality of modules that operate in cooperation with one another. Moreover, although program module 25 is described herein as installed in memory 22, and therefore implemented in software. However, it could be implemented in any hardware (e.g., electronic circuitry), firmware, software, or a combination thereof.

While program module 25 is shown as already loaded into memory 22, it can be configured on a storage device 23 for subsequent loading into memory 22. Storage device 23 is a tangible computer-readable storage medium that stores program module 25 thereon. Examples of storage device 23 include a compact disk, a magnetic tape, a read only memory, an optical storage media, a hard drive or a memory unit consisting of multiple parallel hard drives, and a universal serial bus (USB) flash drive. Alternatively, storage device 23 can be a random access memory, or other type of electronic storage device, located on a remote storage system and coupled to a computer via network 50.

User interface 30 can be a terminal at an airline booth in an airport, a terminal at a travel agent, an online ticket terminal, or any other ticket providing device. User interface 30 has a user 31. User interface 30 can have input devices, such as, for example, a keyboard or scanner for enabling user 31, such as, a ticket provider at an airline, a travel agent, or authorized sales person (hereinafter called "ticket provider 31") to communicate information and command selections for the purchase of a ticket, and perhaps baggage or luggage tags. Ticket provider 31 uses user interface device 30 to input, via an input device, up-to-date passenger and flight information. Such information is transmitted to computer 20. Also, such information can be stored, at least temporarily in memory 32 of user interface device 30, in order to printout passenger and baggage information, as discussed below.

User interface 30 also includes a display (not shown) and an output device (not shown). The output device is, for example, a printer that prints a ticket and/or also prints a baggage or luggage tag. User interface device 30 is connected, via any electronic means other than the Internet, to central computer 20 for receipt of all information including ticket and baggage tag information.

For example, during check-in at an airline terminal, the airline, or user 31 will "tag" the passenger's baggage with a method of monitoring the "tag" baggage by computer 20. Checked-in baggage is bag that is "tagged" by the airline personnel at the check-in counter. Currently, airline personnel normally physically attach a baggage tag to a passenger's baggage at the check-in counter. These baggage "tags" contain a serial number and bar code that allows the airline's computer systems to track the passenger's baggage. The passenger is also given a baggage "tag" portion or receipt with the same serial number and bar code on it. This baggage "tag" receipt is at times physically attached to the boarding ticket that the passenger receives at the check-in counter. The actual baggage tag, baggage tag receipt, and bar code will look different for different airline companies. The passenger's baggage is then taken by the airline personnel. A passenger will usually check-in their baggage simultaneously to receiving their seat assignment and boarding card. Thus, the baggage is considered monitored by the airline if the baggage is somehow "tagged" with an airline identification marker and is under the supervision of airline personnel.

Alternatively, the passenger has the option of printing these baggage "tags" on his or her own before arriving at the airport. In either instance, these baggage tag receipts currently contain a bar code that matches the bar code on the baggage tag that they place on their bag. The passenger will receive a record of the value that the monitoring system assigned to their baggage with their ticket stub.

As used herein bag or baggage includes conventional bags, as well as articles or objects that can be checked in prior to flight. For optimum operation of the system of the present disclosure, user interface 30 can also be operatively connected to a piece of software 33. Preferably, software 33 is installed at either the contract provider or the ticket provider's location in memory 32 whether the location is a booth at an airline terminal, a travel agent, or location of an authorized ticket provider. Software 33 can also be a part of program module 25. Software 33 pulls all pertinent information concerning the ticket purchaser and the baggage tag from the information sent to processor 21 of computer 20.

Software 33 can be installed on the non-internet based ticket provider's or contract provider's local machine or on the internet based ticket or contract provider's website, both "authorized providers." Software 33 can retrieve information from database 43 so that the authorized provider only has to input all the passenger information into their system at one time. Thus, software 33 is barely noticed and will not practically delay the passenger.

The information or data that is necessary to gather is the passenger's contact information, and the information about the actual flight.

For an internet based authorized provider, software 33 will add a check box to its website that will indicate the passenger's selection. Once that selection is made, all the necessary information will automatically be forwarded to program module 25. If an online ticket broker, i.e. authorized provider, has a problem with providing their contract provider information for security or other reasons, a system can be established where the authorized provider would provide information, on a case by case basis, to the contract provider that the passenger has contacted the authorized provider to make a claim of lost baggage.

Analogous to computer 20, is computer 40 having processor 41 that is an electronic device configured of logic circuitry that responds to and executes instructions.

The owner's designated database 43 on host computer 40 is located on a dedicated machine at a designated home site. As defined herein, owner or contract provider is a party that has ownership interest in the technology of the present disclosure, and this definition includes all licensees and sublicenses authorized by the owner and thus, an authorized provider.

Computer 40 includes a processor 41, a memory 42 with program module 45 and software 44, and a database 43 operatively connected to the computer.

A portion of software 44 controls the incoming data concerning the information pulled from user interfaces 30, 34 and the airline computer 20 and stored in database 43. Host computer 40 should be separate from computer 20 so that it is under the control or sole supervision of the owner of the present technology, but can be one and the same. Processor 41 imports and exports data from database 43 for billing purposes. Thus, the owner of this technology, which can also be an authorized provider, can bill its authorized providers.

Computer 40 can be a standalone device, but is not limited to such. Instead, computer 40 can be coupled or connected to other devices via a local network or via network, in a distributed processing system.

Memory 42 is a tangible computer-readable storage device. In this regard, memory 42 stores data and instructions, i.e., program code, readable and executable by a processor for controlling the operation of processor 41. Memory 42 can be implemented in a random access memory (RAM), a hard drive, a read only memory (ROM), or a combination thereof. One component of memory 42 is a program module 45.

Program module 45 contains instructions for controlling processor 41 to execute the methods described herein.

The term "module" is used herein to denote a functional operation that can be embodied either as a stand-alone component or as an integrated configuration of a plurality of subordinate components. Thus, program module 45 can be implemented as a single module or as a plurality of modules that operate in cooperation with one another. Moreover, although program module 45 is described herein as installed in memory 42, and therefore implemented in software, it could be implemented in any of hardware (e.g., electronic circuitry), firmware, software, or any combination thereof.

While program module 45 is illustrated as loaded into memory 42, the program module can be configured on a storage device 48 for subsequent loading into memory 42. Storage device 48 can be the same as storage device 23 in that it can be a tangible computer-readable storage medium that stores program module 45 thereon. Examples of storage device 48 include, but are not limited to, a compact disk, a magnetic tape, a read only memory, an optical storage media, a hard disk drive, solid state driver, or a memory unit consisting of multiple parallel hard drives, and a universal serial bus (USB) flash drive. Alternatively, storage device 48 can be a random access memory, or other type of electronic storage device, located on a remote storage system and coupled to the computer via a network.

As mentioned above, system 100 includes at least one database 43 that communicatively coupled to computer 40. Database 43 contains data 49, as described in the present disclosure, that can be configured as a plurality of separate databases on a plurality of storage devices. Database 43 has all necessary security precautions. These precautions prevent an outside or unauthorized person from hacking into database 43 and, thus, stealing or accessing personal information.

User devices and user interfaces 34 include, but are not limited to, desk-top or laptop computers, mobile telecommunications devices, or other devices as known in the art. System parameters can be managed in system 100, and system 100 can be a single computer or a structure linked to a computer. These system parameters can be used to parameterize specific functionalities when the item does not justify creating a database table and an administration section. An administrator can add, edit, or delete a parameter.

Business units can be managed within system 100. These business units can be used for travel agent registration. An administrator can add, edit, or delete a business unit.

Provided in system 100 of the present disclosure are system functionality screens via a user interface that describe the system functionality available to designated passengers and personnel who can access the screens and processes related to system functionality.

The service agreement purchasing screen allows customers to purchase a service agreement.

The service agreement purchasing screen can be initiated from authorized provider homepage (not shown) served by computer 40 or from a direct link provided in an email. Fields can include level of service, airline confirmation number, originating airline, originating flight number, number of passengers, passenger information, first name, last name, and email address.

In a summary of services screen, the following information will auto-calculate as a user changes the values in level of service and number of passenger fields: service level will display the service level selected, passengers covered will display the number of passenger selected, maximum payout, and service cost.

In operation, passenger 35 selects the level of services to purchase for one or more passengers on same trip. Passenger 35 selects a level of coverage. Passenger 35 provides basic trip information including: airline confirmation number, originating airline, and originating flight. Passenger 35 selects the number of passengers on the trip. The passenger information displays as one line for each passenger. Passenger 35 enters the first name, last name, and email address for each passenger covered by the service agreement on the trip. Passenger 35 can checkout to initiate the payment process.

If payment process is successful, system 100 will create a new service agreement in database 43 with an Id of the form YYXXXXXXXX. YY will designate the ticket merchant. Ticket merchant designations can be, PA, for service agreements purchased directly by passengers. The remaining portion of the Id is an automatically incremented number. For visualization purposes (only at screen level, not at database level) the numeric part will be completed with left zeroes to complete a total of 8 digits, i.e. PA00000004. If in a future the numeric part exceeds 8 digits, they will be shown directly, i.e. PA123456789.

A field will be present in the service agreement record indicating that this service agreement was purchased directly by passenger 35.

Figure 2:
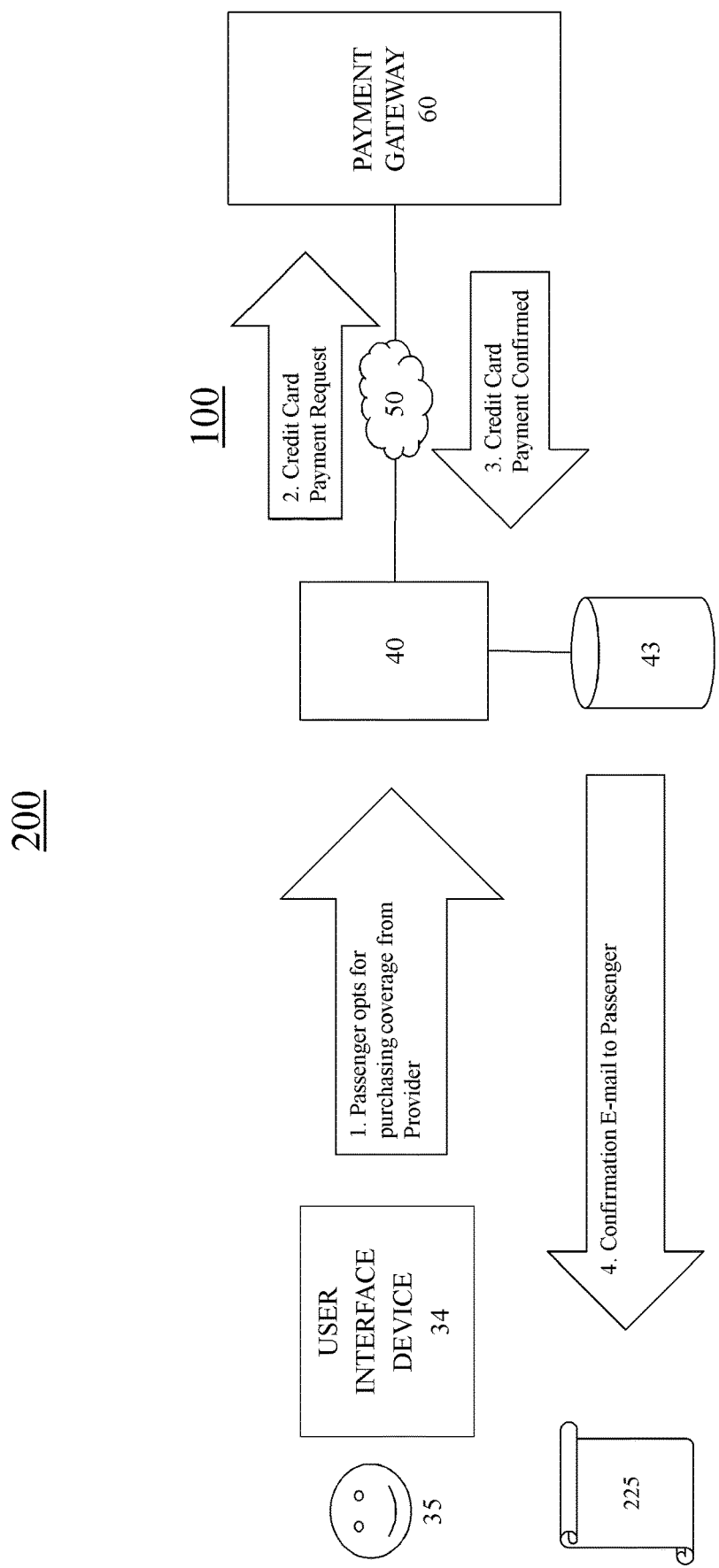
FIG. 2 is an illustration of the passenger purchasing process.

Referring to FIG. 2, system 100 generates an email confirmation 255 to passenger 35 included in the coverage after a shopping cart purchase was successful. If the payment process was unsuccessful, system 100 logs the cause as indicated in an audit trail section and no service agreement record will be saved in database 43.

A passenger purchasing process of the present disclosure is shown in FIG. 2 and is generally represented by reference numeral 200. Process 200 includes system 100 that, in turn, includes a computer 40 linked to a database 43 as shown in FIG. 1. System 100, as shown in FIG. 1, includes one or more user devices 34, each of which is communicatively coupled to a network 50, e.g., the Internet, and the communications conducted via network 50 are by electronic or optical signals. The significance of system 100 is that it provides real time information to the airline and the contract provider or owner of the coverage. Thus, the tracking of passenger and baggage information from amongst many airlines and along different "legs" of a trip and whether the baggage that moves along these legs are insured can be determined. Further, should a covered baggage be lost and declared so by the airline that carried or transported the luggage, the contract provider or owner can be advised and subsequently can pay the owner of the lost baggage.

For the passenger to receive compensation for the lost baggage the passenger must provide the contract provider with a copy of the ticket stub and the baggage receipt tag provided to them before the passenger will receive payment. Once that documentation has been presented, confirmation by the contract provider directly with the airline takes place. Confirmation can be made via telephone, email, or any other method of communication. Alternatively, the contract provider could establish a database or some other automated system with the airline companies that will allow this process to be done automatically by the contract provider.

Figure 3:
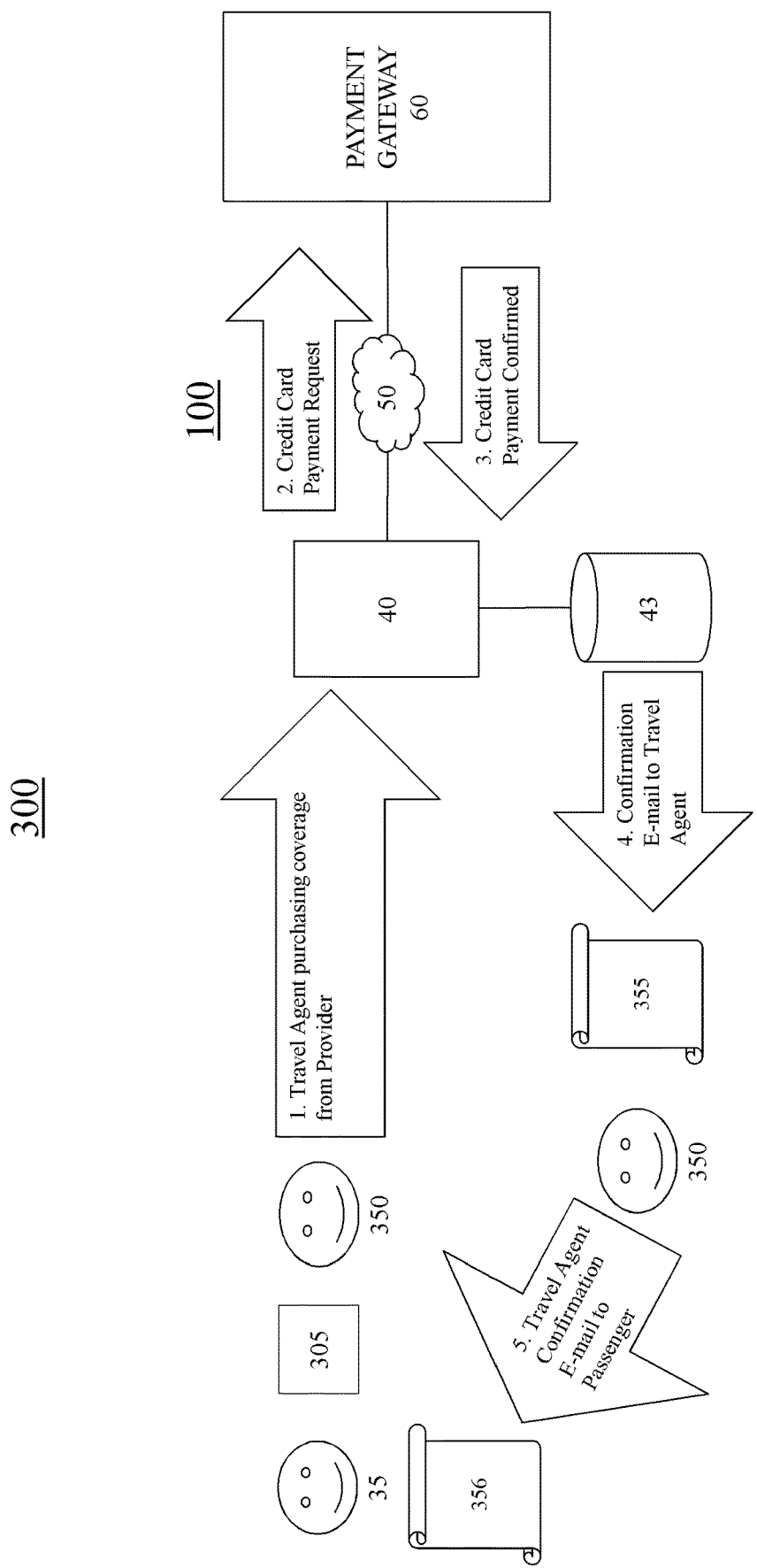
FIG. 3 is an illustration of the travel agent purchasing process.

A contract provider offers a service agreement for baggage loss on US domestic flights. The service agreement allows a purchaser to select different coverage amounts, defined herein as premium. A service agreement can cover one, some, or all passengers on an airline booking. Passenger 35 is a customer who has purchased a service agreement as illustrated in FIGS. 2 and 3.

The service agreement premiums are set at predetermined amounts. For example, the amounts can be $1000 per bag for $5.00 premium, or $1500 per bag for $7.50 premium, or $2000 per bag for $10.00 premium. Although envisioned that the premium will be on a per passenger basis, other rates bases can be employed. The number of segments that form or comprise a trip does not affect the premium.

Figure 4:
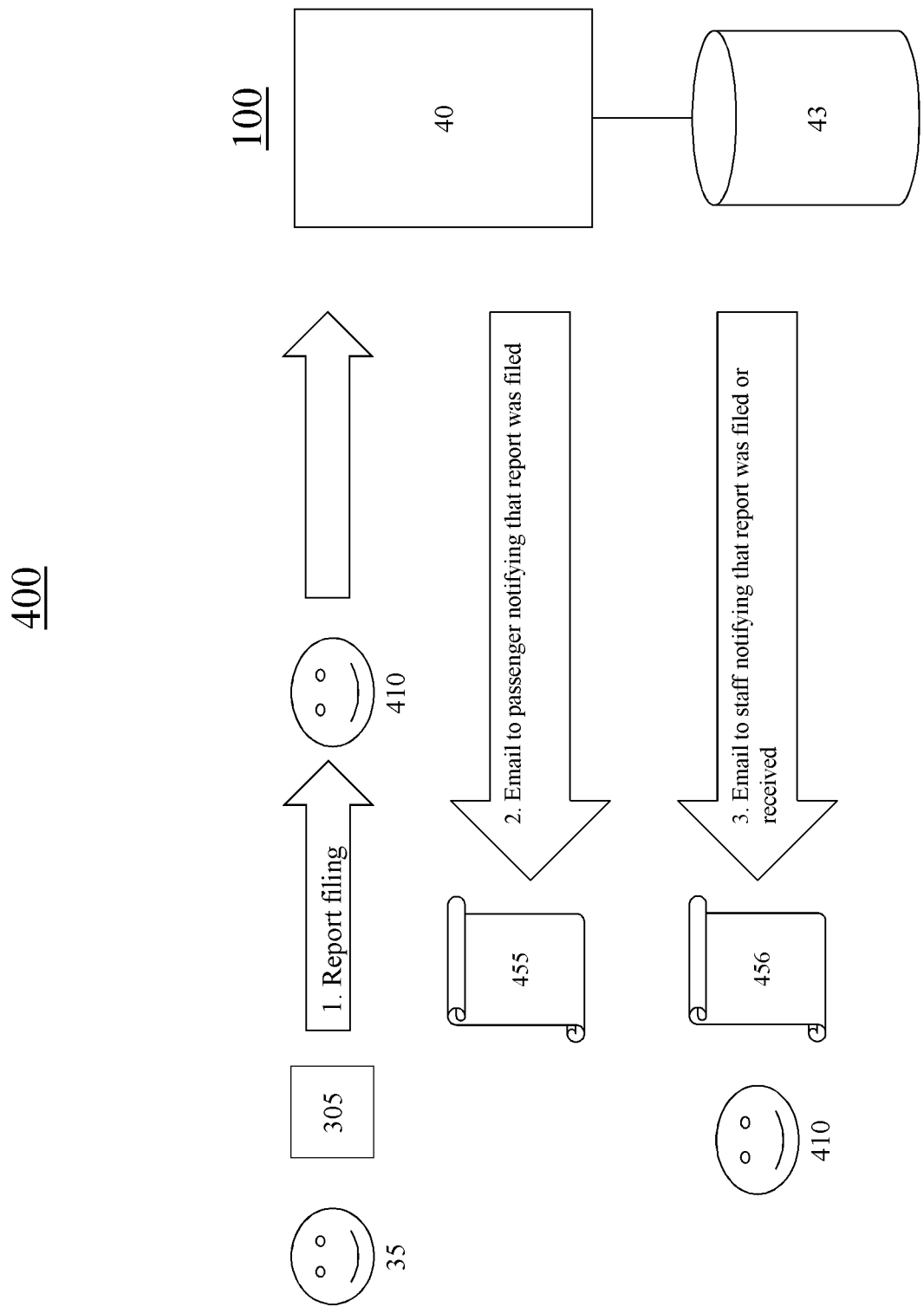
FIG. 4 is an illustration of the filing a mishandled baggage report by phone process.

It is envisioned that a typical service agreement include as follows. The service agreement covers all bags checked in by the passenger(s) at the check-in counter upon arrival at the airport. Upon declaring a loss, contract provider only covers a predetermined number of bags, such as up to 2 bags per passenger, on the service agreement. Passenger 35 has a predetermined amount of time, such as 4 days, from the date of their flight arriving to file a mishandled baggage report with contract provider, as illustrated in FIG. 4. A mishandled baggage report is a report that a passenger 35 or staff member 410 files in the case of a missing bag. A mishandled bag is a bag not delivered to the carousel when passenger 35 arrives at their destination. A lost bag is a mishandled bag that is not returned to passenger 35 within a predetermined amount of time after flight arrival, such as 4 days. The determination of whether a bag is lost is made by the airline or airport and not by contract provider.

Figure 5:
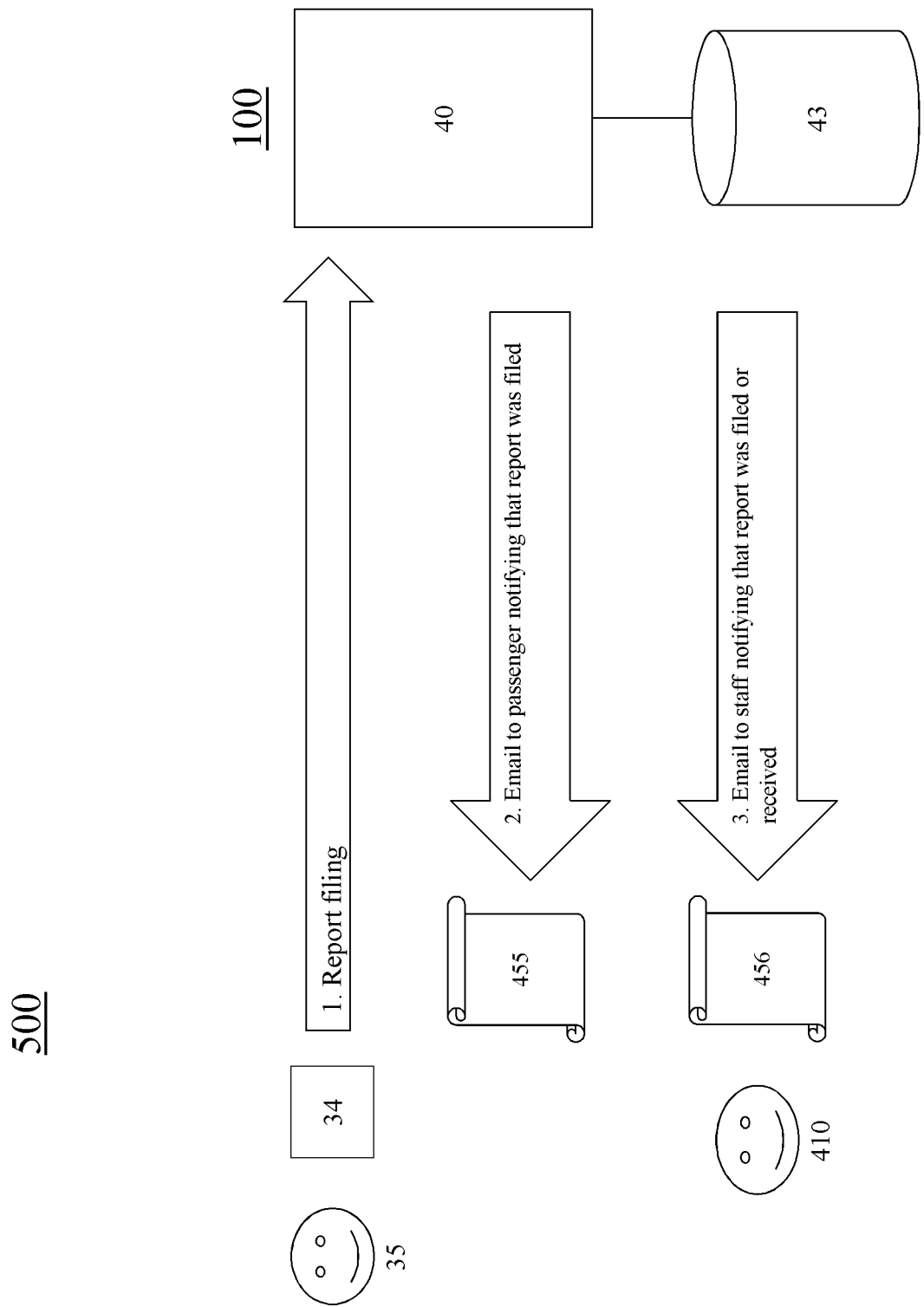
FIG. 5 is an illustration of the filing a mishandled baggage report by website process.
Figure 7:
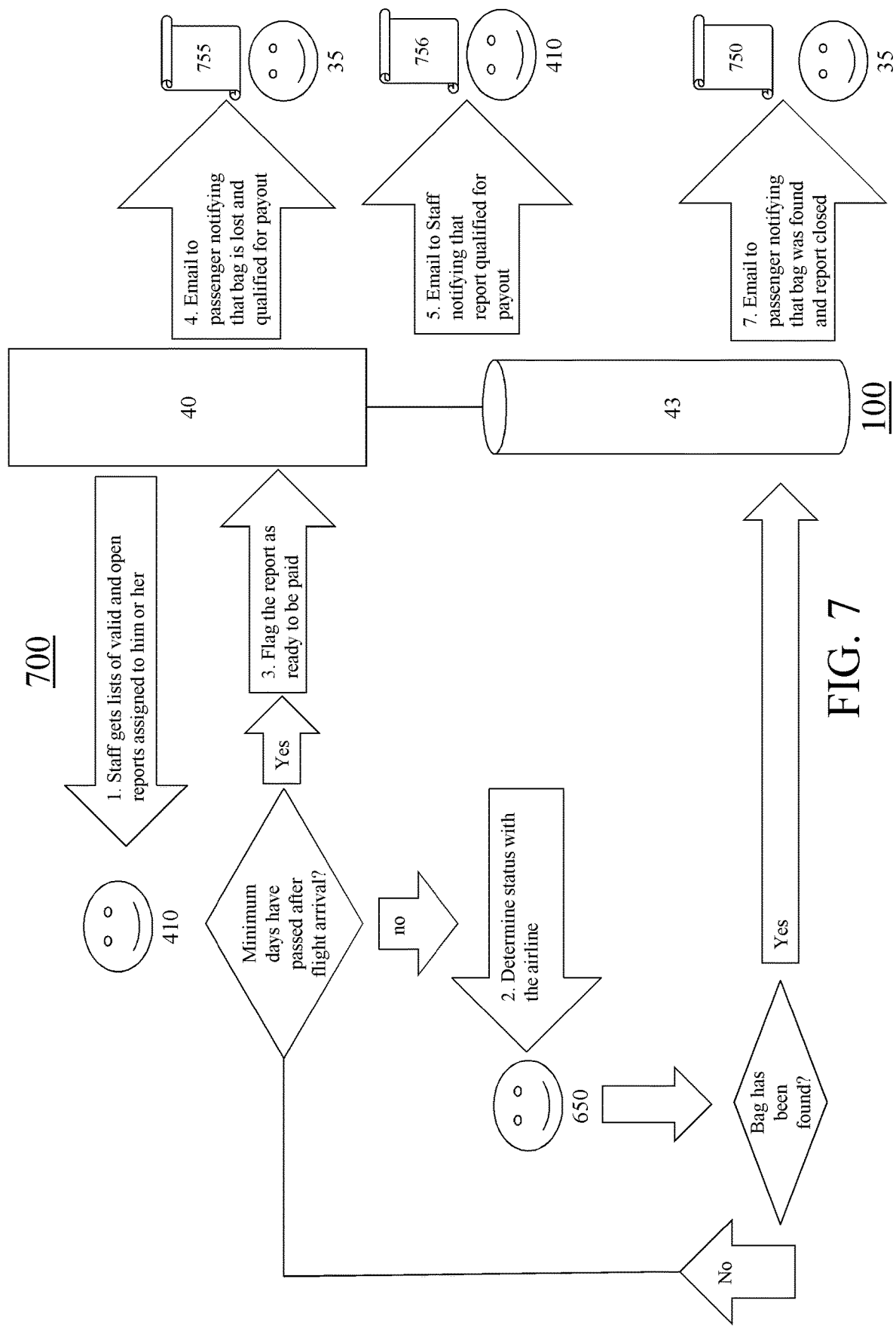
FIG. 7 is an illustration of the declaring a loss in a mishandled baggage report process.

One premium covers a round trip ticket for passenger 35, regardless of the number of stopovers. If a mishandled bag is not returned within the predetermined time, contract provider declares a loss and pays passenger 35, as illustrated in FIG. 7. No proof of the bag contents will be required. Mishandled baggage reports can be submitted simply and easily by passenger 35 either by phone 305, illustrated in FIG. 4 or online, as illustrated in FIG. 5 via a user interface or user device 34.

Once a customer decides to purchase a service agreement, he/she has to choose the level of desired coverage and the number of passengers on their airline confirmation. The premium is billed directly by contract provider and in accordance with applicable law.

Passenger 35 can purchase a service agreement directly from a website or through a travel agent 350. Travel agent 350 is an agent that can purchase a service agreement for their clients. A service agreement number is a unique identifier for a service agreement.

Referring to FIG. 3, the travel agent purchasing process 300 is illustrated. Referring to FIG. 3, system 100 will generate an email 355 to travel agent 350 and an email 356 confirmation to passengers 35 included in the coverage after a shopping cart purchase was successful. If payment process was unsuccessful, system 100 will log the cause as indicated in an audit trail section and no service agreement record will be saved in database 43.

Travel agent 350 will not be able to edit/change information on a purchased service agreement.

Travel agent 350 can view service agreement details on a service agreement that they had purchased. For example, the service agreement details can be presented in a pop-up box.

Travel agent 350 can search for a specific service agreement that they had purchased. One way this can be done via the user interface is by inputting a passenger's last name and/or first name and/or service agreement number. The service agreements that match will be shown.

Payment process can be implemented using an external payment gateway 60 to delegate all details of handling sensitive passenger information such as credit card information to a third party company with solid reputation specialized.

It is envisioned that system 100 will not store locally any sensitive information. All information required by the transaction will be passed securely to a payment gateway site. Only information for identifying the payment transaction in case of a complaint will be stored. This can include, for example, the first 2 digits and last 4 digits of the credit card or any basic information in a format that respects PCI compliance.

A travel agent service agreement purchase and management screen allows a preregistered travel agent 350 to purchase service agreements for their clients. In addition, travel agents 350 can view all service agreements that they had previously purchased. Fields can include: level of service, airline, confirmation number, originating airline, originating flight number, number of passengers, passengers' information, first name, last name, email address, and search.

In operation, travel agent 350 selects the level of services to purchase for one or more passengers on the same trip. Travel agent 350 selects a level of coverage. Travel agent 350 can provide basic trip information including: airline confirmation number, originating airline, and originating flight. Travel agent 350 selects the number of passengers on the trip. The passenger information is displayed on one line for each passenger. Travel agent 350 enters the first name, last name, and email address for each passenger covered by the service agreement on the trip. Travel agent 350 can checkout and initiate the payment process.

If payment process is successful, system 100 creates a new service agreement in database 43 with an Id of the form YYXXXXXXXX. YY designates the ticket merchant. Ticket merchant designations can be for example, TL, for service agreements purchased by Travel Leaders Travel Agents. The remaining portion of the Id is an automatically incremented number. For visualization purposes (only at screen level, not at database level) the numeric part will be completed with left zeroes to complete a total of 8 digits, i.e. TL00000004. If in a future the numeric part exceeds 8 digits, they will be shown directly, i.e. TL123456789.

A field will be present in the service agreement record indicating that this service agreement was purchased by a travel agent on behalf of a passenger.

Referring to FIGS. 3 and 4, if one or more bags are not delivered to the airport's baggage carousel when the passenger arrives at their destination, a passenger files a mishandled baggage report using the a website served by computer 40 or a contract provider phone line 305. Passenger 35 must provide: a service agreement number, bag tag numbers for each bag on the baggage claim from the airlines, and reference number from the claim they filed with the airlines. Tag number and file reference number are airline issued unique identifiers of a lost baggage claim filed with the airlines. Personal information must match the personal information passenger 35 used to make their claim with the airline.

The steps for filing a mishandled baggage report via telephone are illustrated in FIG. 4 as mishandled baggage report by phone process, generally referenced by numeral 400.

Figure 6:
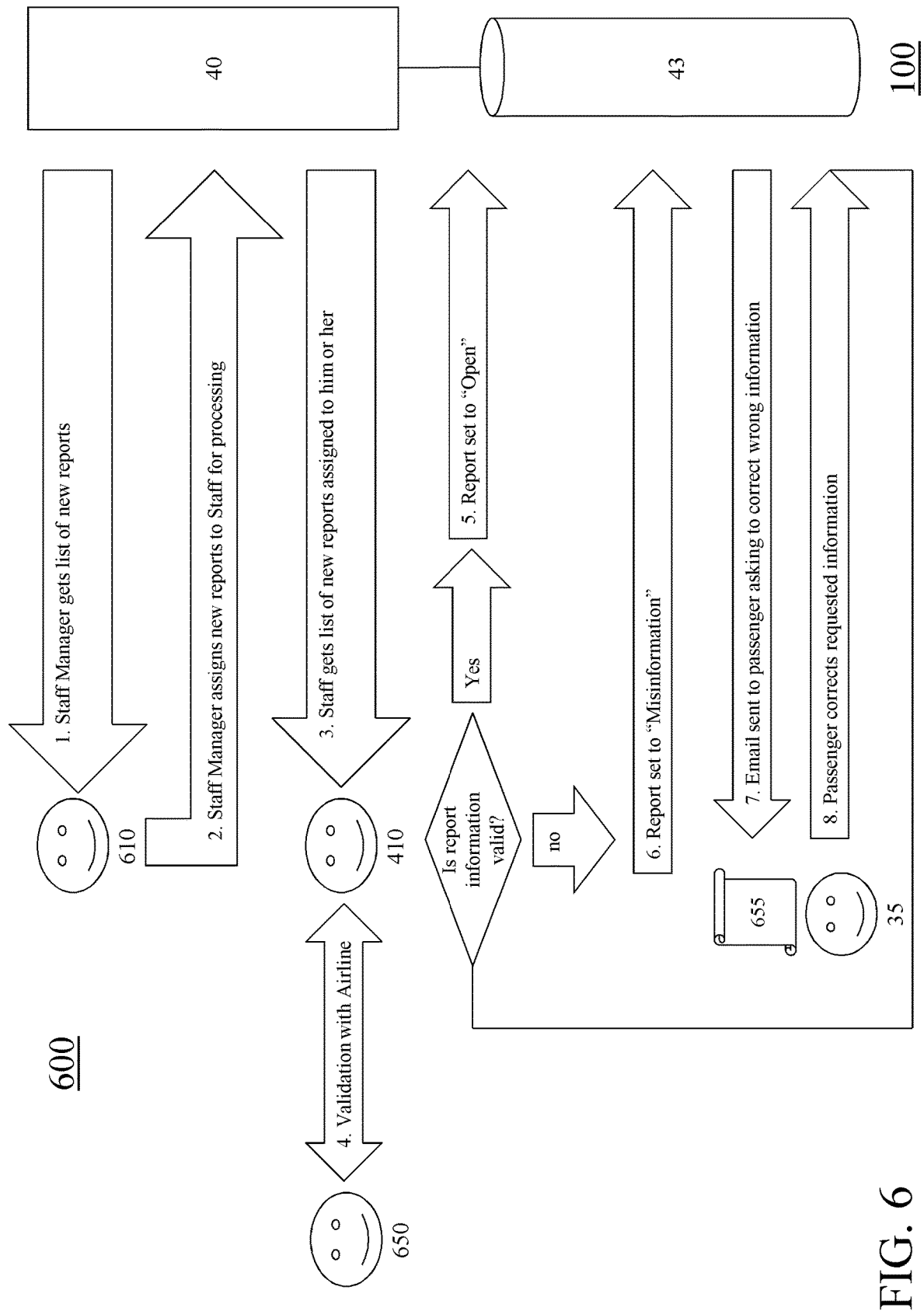
FIG. 6 is an illustration of the processing a mishandled baggage report process.

The steps for filing a mishandled baggage report via web site are illustrated in FIG. 5, and the processing of the mishandled baggage report process is shown in FIG. 6. Referring to FIG. 5, a mishandled baggage report by website process is generally referenced by numeral 500.

Once a mishandled baggage report is filed, as shown in FIG. 6, staff member 410 will contact the airline operator 650 to confirm that the information provided during the filing process is valid and mishandled baggage report is appropriate. Staff member 410 is the contract provider personnel in charge of processing and monitoring a mishandled baggage report. The steps for processing a mishandled baggage report are generally referenced by numeral 600 and illustrated in FIG. 6.

If the mishandled baggage report is valid, staff member 410 will contact daily airline operator 650 to determine whether the bag or baggage has been found. If the baggage has not been located within predetermined amount of time, staff member 410 determines that the mishandled baggage report should be declared a loss. The steps for declaring a loss in a mishandled baggage report process is generally referenced by numeral 700 and illustrated in FIG. 7.

System 100 has several primary areas of focus, administrative, system functionality, background tasks, reports, and dashboard. Administrative areas are screens intended to provide the foundation for the functional processing. These screens are intended to be used more for maintenance purposes than daily production use. System functionality screens support daily operations by the user community. Background tasks are processes run automatically. Dashboard screens provide key information to staff managers 610 and staff members 410. Staff managers 610, shown in FIG. 6, are the contract provider personnel who can access key business information as well as administer system 100.

The major administrative modules include: users management, airlines management, travel agent management, system parameters management.

The major system functional modules include: service agreement purchasing, mishandled baggage report filing, and mishandled baggage report processing.

The major dashboard modules include: service agreement and mishandled baggage report statistics.

System 100 and the method of the present disclosure use a computer system that has been developed using modern, generally accepted standards-based development methods, tools, and software. Adequate rights protection and/or licensing ensure the ability to maintain the application software.

It is envisioned that the web-based solution will be used by hundreds of thousands of users and therefore requires an enterprise-level, mission-critical, very high performance database design and n-tier system architecture. When critical functionality requires high performance, SQL queries can be contained in stored procedures. It is desirable to have architecture designed with simplicity in mind.

In one embodiment, computer 40 can be an ASP.NET/C# web based system and an SQL Server can be used as database 43. Access to the web pages can be through HTTPS (a secure protocol). Database 43 should have appropriate referential integrity to support transactional replication.

Data 49 related to user's actions are recorded in database 43 and should contain the following fields: date and time record created, identity of the record creator which should be filled in when the record is created, the date and time record last modified, identity of the record modifier which should be updated every time a record is updated.

The public screens should support editing and presentation using commonly known web browsers and standards.

Data entry should utilize known validation methods to ensure that data entry is free of errors. For example, the phone number can contain up to 20 characters, the Zip code can contain up to 9 characters, and the email is in a proper format such as xxx@xxx.xxx.

System 100 of the present disclosure should use standard and known security measures. Any screen that is presenting passenger specific information must be under SSL control. Only users who enter a valid and unique user name and password can access the secured areas of the system. The application should be designed and developed such that no one can access its secured features without first logging in.

It is envisioned that each user added to system 100 will be assigned a user type. User types are named groupings of specific application permissions. Each user type will be granted or denied permission to access the various screens and processes within the system. The user type assigned to a user determines that user's rights and privileges within system 100. As a user attempts to visit each screen in system 100, the application first checks to see if the user belongs to a user type that has been granted the appropriate access rights.

To log in, the user enters a valid user name and password. Once validated by system 100, the system presents the authorized screens unless it is the first time for that user. In the case of a first time user, the user is required to supply a new password. It is envisioned that the user's password contain at least eight characters with at least one alphabetic, one numeric value and one special character with at least one of the alphabetic characters capitalized.

Administration screens allow the management of users in the system including the ability to add a new user or assign a user type to each user. Security restrictions are associated to user types. The screens to which a user has access will be restricted by user type and that user type information will be stored in the database. A user has the ability to conduct searches based on predetermined groups and criteria associated with that user type.

One such user type that can be assigned to a user is travel agent. Information associated with a travel agent user type should include: travel agency name, travel agency code, travel agent id, and business unit.

Airlines can be managed in system 100. An administrator can add a new airline or edit an existing airline by entering all the required airline information into system 100. Airline information will be needed for filing and processing mishandled baggage reports per FIGS. 5 and 6.

Referring to FIGS. 1, 2, and 3, payment gateway 60 can be any of known virtual merchants. The payment process will be performed through secure calls to the API provided by the payment gateway company. The transaction process can be initiated from the passenger purchase service agreement screen. The amount to be charged should be shown on the screen.

Provided in system 100 of the present disclosure is a mishandled baggage report filing form. The form is accessible via a user interface and the process is illustrated in FIG. 5. This screen provides the passenger 35 the ability to file a mishandled baggage report in case their baggage was not found in the carrousel when flight arrived. Passenger 35 is required to file a mishandled baggage report with the airline before filing a mishandled baggage report. The file reference number is required to file a mishandled baggage report.

The mishandled baggage report filing form screen can be initiated from contract provider's homepage or from a direct link provided in an email. Fields can include: arrival flight number, airline, flight arrival date, flight arrival time, time zone, file reference number of lost bags number, baggage tag number, service agreement number, name, address, city, country, state, zip code, phone number.

In operation, passenger 35 files a mishandled baggage report. Passenger 35 will provide flight information including: arrival flight number, airline, flight arrival date, time and time zone. Passenger 35 provides claim information including: file reference number. Passenger 35 selects the number of bags lost or baggage tag number (at least one) and service agreement number. Passenger 35 provides personal information exactly as it appears on their lost baggage claim with the airline including: name, address, city, state, country, zip, phone, email address, and email address confirmation.

After passenger 35 selects to file the report and to register the mishandled baggage report, a confirmation dialog should appear. If passenger 35 wishes to file a second report, a new blank form is presented to file another mishandled baggage report and the process repeats. Otherwise, passenger 35 is redirected to contract provider's homepage.

When a mishandled baggage report is filed, system 100 creates a new report in database 43 with an Id of the form MBRXXXXXXXX. MBR stands for mishandled baggage report and the renaming portion of the Id is an automatically incremented number; a status set as new, a field indicating not assigned to any staff member 410; and a field indicating that the report was filed directly by passenger 35. It is envisioned that for visualization purposes (only at screen level, not at database level) the numeric part will be completed with left zeroes to complete a total of 7 digits, i.e. MBR0000004. If in a future the numeric part exceeds 7 digits, they will be shown directly, i.e. MBR12345678.

System 100 generates an email notification to the staff manager 610, shown in FIG. 6, (and other designated email addresses of staff member 410) when passenger 35 has successfully re-filed a mishandled baggage report to correct misinformation. The list of designated email addresses can be configured in system parameters management section discussed previously.

Referring to FIGS. 4 and 5, system 100 generates an email confirmation 455 to passenger 35 filing the mishandled baggage report when a mishandled baggage report is successfully submitted.

System 100 generates an email confirmation 456 to the staff manager 610 (and any other designated email addresses such as staff member 410) when a passenger 35 has successfully entered a mishandled baggage report. The list of designated. The list of designated email addresses can be configured in a system parameters management section.

User interface provides a screen in which staff member 410 can file a mishandled baggage report for those passengers 35 that had contacted contract provider phone line 305. The screen should be similar to that where a passenger 35 is filing a mishandled baggage report.

User interface is also a screen that provides staff members 410 and staff managers 610 the ability to list the mishandled baggage reports as an auxiliary screen for handling mishandled baggage report processing. This screen can be initiated from a contract provider administration site menu. The initial screen state for staff managers 610 could vary from the initial state for staff members.

Email addresses can be configured in system parameters management section.

System 100 saves an audit trail record.

It is envisioned that system 100 of the present disclosure will notify a passenger 35 of errors in submissions. Passenger 35 receives a misinformation notification and can then correct any wrong information. Examples of errors include, but are not limited to, file reference number is blank, baggage tag number is blank, service agreement number is blank, or service agreement number is incorrect.

In the case where passenger 35 filed a mishandled baggage report with errors, the passenger will receive an email notification 655 stating that some information does not match the airline claim information. Passenger 35 calls a contract provider 0800 number to provide the correct information to staff member 410 or the passenger can click on the secure link provided in the notification email that leads the passenger to the a user interface screen where the passenger will be asked to correct information. For example, the wrong information could be highlighted in red. It is envisioned that only fields with wrong information will be editable. For example, all remaining fields show the information but will be just labels to prevent passenger 35 from changing information that was already validated against the airline by staff member 410.

Passenger 35 can select to re-file report to send the correct information, setting the report status as new again and a notification dialog appears. Passenger 35 is redirected to contract provider's homepage. A confirmation email 550 is sent to passenger 35.

Referring to FIG. 4, staff member 410 can file a mishandled baggage report for passenger 35 who contacted through contract provider phone line 305. Staff member 410 provides passenger's flight information including: arrival flight number, airline, flight arrival date, time and time zone. Staff member 410 provides passenger's claim information including: file reference number, baggage tag number (at least one) and service agreement number. Staff member 410 provides passenger's personal information exactly as it appears on their lost baggage claim with the airline including: name, address, city, country, state, zip, phone, email address and email address confirmation Staff member 410 can select to file report to register the mishandled baggage report and a confirmation dialog appears. If staff member 410 wishes, a new blank form is presented to file another mishandled baggage report and the process repeats. Otherwise, staff member 410 is redirected to staff members' homepage.

When a mishandled baggage report is filed, system 100 creates a new report in the database 43 with: an Id of the form MBRXXXXXXXX. MBR stands for mishandled baggage report and the renaming portion of the Id is an automatically incremented number; a status set as new, a field indicating not assigned to any staff member 410; and a field indicating that the report was filed directly by the staff member and who was that staff member. It is envisioned that for visualization purposes (only at screen level, not at database level) the numeric part will be completed with left zeroes to complete a total of 7 digits, i.e. MBR0000004. If in a future the numeric part exceeds 7 digits, they will be shown directly, i.e. MBR12345678.

In operation, a staff member 410 or staff manager 610 can search for mishandled baggage report using specific filtering criteria. Staff member 410 or staff manager 610 can provide information to a search form by combining criteria at will and select and select to view the search results. Staff member 410 or staff manager 610 can print the results or to create and open a file, such as a PDF file, with the content of the search result for current criteria and order. Staff member 410 or staff manager 610 can export a file such as a CSV file of the contents in the search result. A message window will appear in which staff member 410 or staff manager 610 selects where they want to save the file. The file will be saved to the selected location. Staff member 410 or staff manager 610 can clear the form and reset the search page to its initial state.

A staff manager 610 can assign mishandled baggage reports to a staff member 410 singly or in batch. In the case where staff manager 610 wants to assign mishandled baggage reports to a particular staff member 410, the staff manager will select the mishandled baggage reports to assign.

A mishandled baggage report detail screen provides staff members 410 and staff managers 610 the ability to view and edit the information and status for a mishandled baggage report.

It is envisioned that mishandled baggage report detail screen is initiated when a mishandled baggage report is selected on the mishandled baggage report lookup screen. The mishandled baggage report details are populated with all information that is known for the selected mishandled baggage report. If a report has a staff member 410 assigned, it is set to that staff member, and otherwise it is set to unassigned. If the current user is a staff member 410 but is not the processor assigned to the report, all controls will be locked and buttons disabled. The only enabled controls and buttons will be those to assign a processor. If the current user is the staff member 410 assigned to the report or a staff manager 610, additional controls and buttons will be enabled. Fields can include: processor, service agreement number, mishandled baggage report number, airline, confirmation number, airline, flight number, flight arrival date, flight arrival time, time zone, file reference number, lost bags number, baggage tag number (n), returned (n) and passenger name.

Staff member 410 or staff manager 610 can modify information in a report details section. Staff member 410 or staff manager 610 can make changes to the user record.

When saving, the system 100 will log an audit trail record.

Staff member 410 or staff manager 610 can add a note. Staff member 410 or staff manager 610 can enter a note on a notes text area. When saving the note, system 100 will log an audit trail record.

Staff member 410 or staff manager 610 can assign the report to their self or to another processor. When saving the assignment, system 100 will log an audit trail.

After validating that report information is correct, staff member 410 or staff manager 610 can change the report status to open. When changing the status, system 100 will log an audit trail record.

After validating that report information is incorrect, staff member 410 or staff manager 610 can change the report status to misinformation. It is envisioned that staff member 410 or staff manager 610 can mark all checkboxes that are shown in the status frame that corresponds to wrong information. Staff member 410 or staff manager 610 can indicate that there is misinformation. System 100 saves status change and while the report is in a misinformation state, the incorrect fields will be flagged, such as being shown in red, every time the screen is accessed. System 100 sends email 555 to the passenger asking to correct the wrong information. When changing the status, system 100 logs an audit trail record.

After validating that bags were found before the limit date, staff member 410 or staff manager 610 can change the report status to close.

System 100 sends an email 750 to passenger 35 indicating that the report was closed. When changing the status, the system will again log an audit trail record After validating that bags were not found after the limit date, an assigned staff member 410 or staff manager 610 can change the report status to loss. Staff member 410 or staff manager 610 can do so, for example, by clicking on a loss button via a user interface. It is envisioned that as a check mechanism, when a loss button is clicked and all baggage tag numbers are checked as returned, an error message will be shown. It is envisioned that if one or more baggage tag numbers have a returned checkbox unchecked, a confirmation dialog will appear: "You are about to set <n> bag(s) as qualified for payout. Do you want to proceed? (Yes) (No)". The <n> value will be 1 in the case that only one bag is set as NOT returned and 2 (according to system parameter) if two or more bags are set as NOT returned. System 100 sends an email 755 to the passenger indicating that the report qualified for a payout. System 100 sends an email 756 to contract provider indicating that the report qualified for a payout. When changing the status, system 100 again logs an audit trail record.

Referring to FIG. 3, a screen is provided via a user interface to allow travel agents 350 to register with contract provider. Once registered, the travel agent can purchase services agreements on their client's behalf.

Contract provider can provide travel agent business groups with a link to be placed on their intranet sites. Travel agents can access the contract provider registration form from this link. This link will be the same for all travel agent business groups and the travel agent will choose to which business unit they belong to as part of the registration process.

It is envisioned that travel agent 350 accesses the registration form after clicking a provided link on their travel agency intranet site. Travel agent 350 provides all the required information and agreeing to terms and conditions. Then, travel agent 350 must press save. System 100 creates the user as a travel agent type and leaves it in pending state until the registration is confirmed by the travel agent. System 100 sends travel agent 350 an email containing a welcome message with a link to confirm the registration process. A travel agent 350 must follow the confirmation link provided in the email to provide a definitive password and activate their user. After doing that, the travel agent user becomes active instead of pending and will be able to login into system 100. This confirmation link will be valid for a limited period of time configured as a system parameter, for example, for 5 days. After that period, if a travel agent user has not confirmed the registration yet by clicking the link and providing a definitive password, that user in pending state will be erased from database and the link will be invalid.

Contract provider's product works as follows. An amount will be charged per baggage for a predetermined amount of coverage on an airline passenger's baggage that is monitored by the airline. The passenger will be paid that predetermined amount if their baggage is deemed lost by the airline. The passenger will not have to prove the value of the items or contents in the baggage. All losses will be paid the same predetermined amount. A claim of lost baggage can be made by a passenger after a first, set time period, which will be a time sufficient enough for the airline to determine if the bag is indeed lost and, thus, deemed lost. Preferably, this first time period will be one month. However, a slightly shorter time, such as three weeks, or a longer period of time such as forty-five days to sixty days (two months) can be selected. After this first period of time has passed, and provided the baggage has not been found, the passenger will have a second, set period of time to make the claim. This second period of time is longer than the first period of time. There will be a limit on the amount of time the passenger has to make a claim.

The submission of a claim will only take a few minutes. The passenger will contact the contract provider with the baggage receipt tag that the authorized provider presented them at their time of check-in. Contract provider will independently confirm with the airline that the airline is at fault. If that is the case, contract provider will pay the passenger a predetermined amount.

Contract provider will have its premium charged to the passenger in one of two ways. First, the premium can be charged by the ticket provider during ticket purchase. Alternatively, the passenger can purchase the coverage directly from contract provider or from a broker, or even an independent sales person that is licensed to sell the coverage, and thus all are authorized providers. The passenger will have the choice of declining to purchase this policy if they so choose.

The passenger will buy baggage coverage either at the time of the ticket purchase or at a later time, but in either case, the premium must be received by authorized provider before the passenger turns their luggage over to the airline monitoring system. The premium for this coverage is non-refundable even in the event of trip cancellation. The premium will cover the monitored baggage that the passenger is traveling with for each leg of a journey with an unlimited number of stopovers in each direction. Currently airlines only monitor baggage that is checked-in.

In another embodiment, at the time of ticket purchase, the passenger will not know the number of bags they will check. Contract provider can designate, and preferably will designate, that only two bags are covered since most airlines will only allow passengers to travel with two bags checked-in. If the passenger knows they want to have more bags covered, additional baggage can be added to their policy for additional premium as long as that baggage is also monitored by the airline.

In the event of a third baggage is checked-in, the third baggage will be the bag with the highest serial number, bar code, or other indicia assigned to it by the airline when it commences monitoring the baggage.

If, in the future, serial numbers cannot be used, there can be another way to identify baggage that airlines will use. If that situation, there will still be a different identifying "indicia" used to differentiate bags from one another by the airline's computer system 400.

A discounted rate can be applied for multiple tickets for which contract provider's coverage is purchased at the same time.

Another aspect of the present disclosure is that aspects of the baggage are considered out of the airlines monitoring system, which also can include legs of a trip. Currently, it is standard for flights to stop for a few hours along a flight. To differentiate between a single leg and multiple legs, there will be a separate premium if, at any time, baggage leaves the airline's monitoring system.

If a passenger is on a single flight with a single airline, and that flight stops for a short amount of time, the baggage is considered under the airline monitoring system's control. However, if the passenger is booked on a connecting flight from one location to another location that could have the baggage leave, for a period of time, the airline's monitoring system.

To differentiate between a stop-over that effects the baggage staying within or leaving the airline monitoring control system, any flight where two legs (one before and other after the stop-over) are separated by a very long period of time, for example, five (5) hours or more (from arrival until departure) will be considered out of the airline monitoring system regardless if the airline continues to monitor the baggage. Thus, five (5) hours is arbitrarily chosen. In addition, there are situations where there is a change of airlines or movement of the baggage from one plane to another, which can be considered out of the airline monitoring system.

As an example, normally each leg of a journey will be charged a separate premium. A typical flight will have two legs. If there are more than two legs, the additional premium will be charged according to the same rules. As an example for illustrative purposes:

Leg 1—A passenger flies from New York to Cleveland and stays in Cleveland overnight, namely more than 5 hours.

Leg 2—The passenger then flies to Chicago for a 2 hour stopover on the way to Los Angeles. During this stopover, the passenger does not have their baggage returned to them.

Leg 3—The passenger continues on to Los Angeles, and stops there for an extended period of more than five hours.

Leg 4—After a few days, the passenger travels from Los Angeles to Dallas on the way back to New York. In Dallas there is a six (6) hour stopover. During that time, the passenger's baggage is not returned.

Leg 5—The passenger departs Dallas and flies to New Orleans on the way to New York. In New Orleans, there is a three and one-half (3½) hour stopover where the baggage is returned to the passenger.

Leg 6—The passenger continues from New Orleans to New York.

For this example, assume that contract provider will charge 1× of premium per leg, here the passenger would be charged 5× for a policy. There are five (5) charged legs to this trip. The stopover in Chicago does not count as an additional leg because the passenger's baggage was monitored by the airline and the stop was less than five (5) hours. The stopover in New Orleans counts as a separate leg because the baggage was not being monitored by the airline during that time.

The passenger receives a record of the value that the airline monitoring system assigned to their baggage with their ticket stub. The passenger must provide contract provider with a copy of the ticket stub and record of the baggage receipt tag provided to them by the airline before they will receive payment.

Once that documentation has been presented, confirmation by contract provider directly with the airline will take place. Confirmation can be made via telephone, email, or any other method of communication. Alternatively, contract provider could establish a database or some other automated system with the airline companies that will allow this process to be done automatically.

To reduce the risk of fraudulent claims, contract provider confirms every claim with the airline before the claim is paid. A claim monitoring system will be developed in order to detect fraud. For example, the passenger can only make a claim after a designated time period after their flight lands. The airline needs enough time to determine if it has lost the passenger's baggage. Also, the passenger forfeits the right to make a claim within a broad but reasonable period after the passenger is made aware that the airline confirmed or deemed that the baggage is lost.

The insured passenger procedure and coverage characteristics will include the following. The passenger buys contract provider's coverage at the time of ticket purchase or at a later date, but the passenger must purchase the coverage prior to the flight. The premium must be paid before the passenger delivers the bags into the care of the monitoring system of the airline. Again, lost baggage is a complete loss subject to full coverage. Contract provider pays a passenger whose baggage is lost a predetermined fixed amount that is the same for every passenger baggage, no matter what the contents of the baggage. The payment is conditional on the baggage being deemed or declared lost by the airline. Contract provider confirms that fact with the airline. The passenger can submit a claim after the designated time period after their flight lands. If that claim is in fact legitimate, the passenger is mailed a check for the amount that was predetermined. Again, there can be an expiration date on the amount of time a passenger can place a claim for lost luggage. If a year passes from the time of the airline flight, the policy is no longer valid.

The passenger purchases coverage from the contract provider. The purchased coverage can come from a few sources, including, but not limited to, forms of traditional insurance policies, service agreements, or contracts. Contract provider can purchase a contract or an insurance policy from an independent insurance company on behalf of passengers. Contract provider can purchase a set amount of coverage vehicles and resell the coverage. Coverage vehicles means contracts, policies or agreements. For example, contract provider establishes a coverage plan with an independent insurance company that will take into consideration the insurance company's coverage of each bag for a different premium amount based on airline, airport, time of year and any other factors that could be deemed necessary. In this coverage plan, the insurance company determines the factors that have a greater risk for a lost passenger's baggage. They could then charge variable rates depending on those factors. Once data has been gathered and records are available, the insurer can establish a different structured coverage plan.

Alternatively, contract provider can be the insurer (for example, by policy or contract).

In either situation, contract provider can receive the rights to the recoverable amount that the passenger could have gotten from the airline directly. When a passenger elects to use contract provider's policy, that passenger can be required to waive the rights to make a claim from the airline for the loss of their bag.

To encourage the airline industry to improve their baggage handling procedures, contract provider will attempt to recover money from the airline for every lost baggage for which they have the recoverable rights. The amount recovered would be more if the covered passenger were to present receipts and documentation of the contents of their bag. Contract provider could offer the passenger a percentage of the recovery if they were to help provide that documentation. If contract provider receives a lower rate quote from their insurance company by ceding those recoveries to them, there will be an added benefit. Contract provider would achieve its goal of making the airline continue to improve its baggage handling procedures at no additional cost. In time, contract provider could receive a set sum per passenger and therefore not make claims from the airline company. This would benefit both the airline and contract provider because they would not have to work on a case by case basis.

Baggage insurance policies that include coverage for other types of baggage losses are available in the marketplace. The baggage loss covered by these policies is coverage regardless of what event caused the baggage to be lost, but in an amount based on the value of the baggage. Contract provider's coverage will only cover baggage lost by the airline. Contract provider's policy assumes that all baggage is valued at the same predetermined amount. Therefore, the passenger does not have to prove the value of their bag or of its contents either before or after their flight. Contract provider's policy will typically be sold at the same point of contact as their ticket purchase. Thus, passengers will not have to look for this coverage.

Contract provider's policy pays a predetermined amount to the passenger every time a verified claim is submitted. A passenger whose bag is lost by the airline will receive a payment of that amount regardless of the contents of the baggage. A passenger will only have to prove that the airline lost their bag.

Thus, the passenger receives several benefits. First, the claim payment procedure saves time. Second, with other policies, the passenger has to prove the value of the bag's contents. That is not the situation here since each baggage will be valued at the same amount. A third benefit is that contract provider's coverage will be easier to purchase than current offerings. This is due to software that will be user friendly and will follow simple guidelines.

Also, authorized providers receive benefits. For example, an authorized provider that deals directly with the airline passenger will only have to make minor modifications to their ticket booking process in order to incorporate software 33 into their system. Contract provider' coverage bundles its premiums into the authorized providers preexisting service fee. The authorized provider will inform the passenger that their service fees include a predetermined amount of coverage for airline bag loss according to previously mentioned guidelines. A passenger that wishes to decline that policy will pay a service fee reduced by an amount of contract provider's premium. If the authorized provider is not interested in bundling contract provider's premium into their service fee, they can sell the passenger the coverage on their own. This could decrease the number of overall sales that the authorized provider will make.

The authorized provider that does not directly meet the airline passengers will have to change their websites or other interfaces in only a minimal fashion in order to get this policy availability. These authorized providers will have the same options as direct sales authorized providers. For example, online ticket agents can be hesitant to bundle contract provider's coverage with their service fee because their fee is very minimal and contract provider's premium would cause it to increase dramatically. However, their commission will cause their profits to increase dramatically as well. If the premium is bundled with the service fee, the passenger can be given the option of deselecting contract provider's policy for a discount in the amount of contract provider's premium.

There can be a "terms and conditions" screen for the passenger to view. The "terms and conditions" screen can be linked. By purchasing the coverage, passenger 35 will have agreed to the "terms and conditions." If passenger 35 is purchasing coverage through a non-web based interface, the passenger will still have to agree to the "terms and conditions."

Additionally, contract provider could ask airlines to pay a fee in return for not making claims on every loss that is ceded to contract provider. In that event, every policy will collect a fee from the airline industry, and that fee will alleviate the need to make use of the ceded losses that contract provider has collected.

Further, contract provider can provide a web page (not shown, but served by computer 40) that describes its product, and helps passengers make claims online. It will also advise passengers to call with any questions or to make a claim. The web site will be used for file transfers or software updates as well. Of course, the site will be updated and maintained periodically.

The techniques described herein are exemplary, and should not be construed as implying any particular limitation on the present disclosure. It should be understood that various alternatives, combinations, and modifications could be devised by those skilled in the art from the present disclosure. For example, steps associated with the processes or methods described herein can be performed in any order, unless otherwise specified or dictated by the steps themselves. The present disclosure is intended to embrace all such alternatives, modifications, and variances that fall within the scope of the appended claims.

The invention claimed is:

1. A process for remuneration for a lost bag that is placed in an airline monitoring system and subsequently confirmed to be lost by an airline, the process performed by a system that comprises: an authorized provider computer having a processor, a memory and a program module and an interface configured to serve a user device of a user or passenger, wherein the user device has an input device, a display and an output device, and is communicatively coupled to the authorized provider computer, the process comprising:

providing the interface configured to allow a user to obtain a coverage offered by the authorized provider for one or more bags notwithstanding the contents of the one or more bags while the one or more bags are within the airline monitoring system, wherein the coverage is selectable from among a plurality of discrete coverage levels displayed on the user device via the interface, and wherein each discrete coverage level is for a different fixed, monetary amount, wherein the interface is configured to allow the user device to select a desired coverage level notwithstanding the contents of the one or more bags, and wherein the interface is configured to allow the user to deselect the coverage offered;

initiating a payment process to purchase the coverage by the user device through a payment gateway that is in communication with the user device and the processor, wherein completion of the payment process can be at any time from ticket purchase until transfer of possession of the one or more bags to the airline monitoring system;

creating, by the processor, upon payment process completion, a service agreement for the coverage, wherein the service agreement is given a unique identifier;

creating a record of the unique identifier in a secured portion of a database;

separately printing, by a printer in communication with the airline monitoring system, a tag for affixing to each of the one or more bags, and a corresponding tag receipt for each of the one or more bags for the passenger, wherein the tag comprises an identifying indicia for use by the airline monitoring system, and wherein the tag receipt has the unique identifier that corresponds to the identifying indicia;

physically affixing each tag to each bag; determining by the passenger, that at least one bag is missing by non-arrival of the at least one bag to a baggage claim area after flight;

sending a mishandled baggage claim to the computer from the user device by using a website served by the computer, wherein the mishandled baggage claim includes the unique identifier and identifying indicia for the missing bag;

communicating, from the computer, a confirmation of receipt of mishandled baggage claim to the user device;

creating, by the processor, a new record of the mishandled baggage claim in the secured portion of the database, wherein the record includes a field that indicates a status as new;

determining, within the airline monitoring system, in response to the mishandled baggage claim field status whether the missing bag is lost in the airline monitoring system, wherein the determining includes evaluating movements of the identifying indicia in the airline monitoring system to determine if the missing bag is not found or accounted for in the airline monitoring system for a fixed period of time;

changing the field status from new to indicate the status as lost after the fixed period of time has passed;

sending in response to the mishandled baggage claim field status a notification to the passenger that the missing bag has the status as lost and that the mishandled baggage claim qualifies for payout; and remunerating the passenger for the lost bag based on the service agreement upon receipt of the tag receipt that corresponds to the identifying indicia of the lost bag without any proof of a value of the contents of the lost bag.

2. The process of claim 1, further comprising:
verifying the accuracy of the mishandled baggage claim.

3. The process of claim 1, wherein the coverage offered is per a leg of a trip.

4. The process of claim 3, further comprising:
determining a number of legs of the trip and determining a length of time of each leg of the trip that is beyond a fixed period of time.

5. The process of claim 4, further comprising:
advising whether more than one service agreement is needed based on the determinations of the number of legs and the total length of time.

6. The process of claim 1, wherein the remuneration is a fixed amount based on the service agreement purchased notwithstanding the contents of the lost bag.

7. The process of claim 1, further comprising creating a physical receipt.

8. The process of claim 1, wherein the lost bag is an article.

\* \* \* \* \*